United States Patent
Jain et al.

(10) Patent No.: US 11,240,247 B2
(45) Date of Patent: Feb. 1, 2022

(54) MULTI-USER COMPUTING DEVICE CONFIGURED FOR EXECUTING APPLICATIONS IN MULTIPLE USER CONTEXTS SIMULTANEOUSLY

(71) Applicant: MICROSOFT TECHNOLOGY LICENSING, LLC, Redmond, WA (US)

(72) Inventors: Raju Jain, Kirkland, WA (US); Kiran Kumar, Redmond, WA (US); Michael C. Hilsdale, Issaquah, WA (US); Jason C. Mayans, Snohomish, WA (US); Paul C. Barr, Carnation, WA (US); Peter G. Davis, Kirkland, WA (US); Jonathan D. Wiswall, Woodinville, WA (US); Craig Thomas McIntyre, Kirkland, WA (US); Guillermo Enrique Rueda, Seattle, WA (US); Tom Coon, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 16/047,956

(22) Filed: Jul. 27, 2018

(65) Prior Publication Data
US 2020/0034106 A1 Jan. 30, 2020

(51) Int. Cl.
*H04L 29/06* (2006.01)
*G06F 21/10* (2013.01)
(Continued)

(52) U.S. Cl.
CPC ............ *H04L 63/101* (2013.01); *G06F 21/10* (2013.01); *G06F 21/6218* (2013.01);
(Continued)

(58) Field of Classification Search
CPC ..... G06F 21/10; G06F 21/6218; H04L 63/101
See application file for complete search history.

(56) References Cited

U.S. PATENT DOCUMENTS 6,208,991 B1 * 3/2001 French ................ H04L 67/1095
7,242,389 B1    7/2007 Stern
(Continued)

OTHER PUBLICATIONS

B. Steinert, M. Grunewald, S. Richter, J. Lincke and R. Hirschfeld, "Multi-user multi-account interaction in groupware supporting single-display collaboration," 2009 5th International Conference on Collaborative Computing: Networking, Applications and Worksharing, 2009, pp. 1-9. (Year: 2009).*

(Continued)

*Primary Examiner* — Kari L Schmidt
(74) *Attorney, Agent, or Firm* — Newport IP, LLC; Jacob P. Rohwer

(57) ABSTRACT

A multi-user computing device, such a communal computing device like an interactive digital whiteboard, can execute single user aware ("SUA") applications and multi-user aware ("MUA") applications. Instances of SUA applications execute in the context of a single user. MUA applications can execute in the contexts of multiple authenticated users simultaneously. A multi-user aware OS platform authenticates and de-authenticates users of the multi-user computing device. The multi-user aware OS platform provides notifications to MUA applications when users are authenticated and de-authenticated. When a new user is authenticated, MUA applications begin executing in the context of the newly authenticated user and any other previously authenticated users. When users are de-authenticated, MUA applications stop executing in the context of the de-authenticated user but continue executing in the context of the remaining authenticated users of the multi-user computing device. Data (Continued)

associated with the de-authenticated user is removed from the multi-user computing device.

15 Claims, 14 Drawing Sheets

(51) Int. Cl.
*G06F 21/62* (2013.01)
*G06F 3/14* (2006.01)
*G06Q 10/10* (2012.01)

(52) U.S. Cl.
CPC ......... *G06F 3/1454* (2013.01); *G06Q 10/103* (2013.01); *H04L 29/06034* (2013.01)

(56) References Cited

U.S. PATENT DOCUMENTS

| | | | | |
|---|---|---|---|---|
| 7,770,134 B2* | 8/2010 | Evans | .................... | G06F 9/461 |
| | | | | 715/827 |
| 7,814,025 B2* | 10/2010 | Roever | .................. | G06F 21/10 |
| | | | | 705/51 |
| 8,556,713 B2* | 10/2013 | Pilip | ....................... | A63F 13/63 |
| | | | | 463/29 |
| 8,682,973 B2 | 3/2014 | Kikin-Gil et al. | | |
| 8,924,735 B2* | 12/2014 | Forbes | .................... | G06F 21/00 |
| | | | | 713/186 |
| 9,384,101 B2* | 7/2016 | Calvo | ................. | G06F 11/0745 |
| 9,445,271 B2* | 9/2016 | Kim | ..................... | H04W 12/08 |
| 9,720,559 B2* | 8/2017 | Tan | ..................... | G06F 3/04883 |
| 9,740,352 B2 | 8/2017 | Ahsan et al. | | |
| 9,985,999 B1* | 5/2018 | Simon | ................... | H04L 65/403 |
| 10,271,159 B2* | 4/2019 | Yamane | ................. | H04W 4/02 |
| 2005/0204296 A1* | 9/2005 | Rossler | ................ | G06F 16/954 |
| | | | | 715/751 |
| 2007/0260675 A1* | 11/2007 | Forlines | .................... | G06F 9/52 |
| | | | | 709/203 |
| 2008/0028391 A1* | 1/2008 | Nallipogu | ................. | G06F 8/61 |
| | | | | 717/174 |
| 2008/0244219 A1* | 10/2008 | Kobayashi | .............. | G06F 9/544 |
| | | | | 711/210 |
| 2008/0313721 A1* | 12/2008 | Corella | ................. | H04L 9/3226 |
| | | | | 726/6 |
| 2009/0125996 A1* | 5/2009 | Guccione | ............ | H04L 63/0853 |
| | | | | 726/6 |
| 2009/0187834 A1* | 7/2009 | Rapo | ....................... | A63F 13/10 |
| | | | | 715/758 |
| 2011/0055329 A1* | 3/2011 | Abt, Jr. | .................. | G06F 16/958 |
| | | | | 709/205 |
| 2011/0092279 A1* | 4/2011 | Pilip | ....................... | A63F 13/77 |
| | | | | 463/29 |
| 2011/0185437 A1 | 7/2011 | Tran et al. | | |
| 2011/0197263 A1* | 8/2011 | Stinson, III | ............. | G06F 3/011 |
| | | | | 726/4 |
| 2014/0115490 A1* | 4/2014 | Yamasani | ............... | G06F 3/048 |
| | | | | 715/743 |
| 2014/0149880 A1 | 5/2014 | Farouki | | |
| 2014/0165152 A1 | 6/2014 | Farouki | | |
| 2014/0250505 A1* | 9/2014 | Kim | ...................... | H04W 12/08 |
| | | | | 726/5 |
| 2016/0266860 A1* | 9/2016 | Nam | ..................... | H04L 65/403 |
| 2016/0330404 A1 | 11/2016 | Nelson et al. | | |
| 2017/0374138 A1 | 12/2017 | Anwer et al. | | |
| 2017/0374156 A1 | 12/2017 | Anwer et al. | | |
| 2020/0380972 A1* | 12/2020 | Carrigan | ................. | G06F 9/451 |

OTHER PUBLICATIONS

Park, Seonwook, et al. "Adam: Adapting multi-user interfaces for collaborative environments in real-time." Proceedings of the 2018 CHI Conference on Human Factors in Computing Systems. 2018, pp. 1-14. (Year: 2018).*

Arora, et al., "Securecedit: An Approach for Secure Cloud-based Document Editing", In Proceedings of the 2016 IEEE Conference on Communications and Network Security, Oct. 17, 2016, pp. 561-564.

Dang, et al., "Performance of Real-Time Collaborative Editors at Large Scale: User Perspective", In Proceedings of the 2016 IFIP Networking Conference and Workshops, May 17, 2016, pp. 548-553.

Mangiante, et al., "SpreadComp platform: A new paradigm for distributed spreadsheet collaboration and composition", In Proceedings of 8th International Conference on Collaborative Computing: Networking, Applications and Worksharing, Oct. 14, 2012, pp. 297-304.

"International Search Report and Written Opinion Issued in PCT Application No. PCT/US2019/038091", dated Oct. 7, 2019, 13 Pages.

"ePoint Multi-screen Management System", Retrieved from: http://www.sali.cn/en/product-details-16.html. Retrieved on Mar. 12, 2018, 5 Pages.

"Multi-user software", Retrieved from: https://www.dicolab.com/products.html, Retrieved on Mar. 12, 2018, 5 Pages.

Mackenzie, et al., "LACOME: a Multi-User Collaboration System for Shared Large Displays", In Proceedings of the ACM conference on Computer Supported Cooperative Work Companion, Feb. 11, 2012, pp. 267-268.

Pablo, Roman Humanes, "A Scalable Distributed Paradigm for Multi-User Interaction with Tiled Rear Projection Display Walls", In Thesis of University of California, 2010, 38 Pages.

Steinert, et al., "Multi-user Multi-account Interaction in Groupware Supporting Single-display Collaboration", In Proceedings of 5th International Conference on Collaborative Computing: Networking, Applications and Worksharing, Nov. 11, 2009, 9 Pages.

* cited by examiner

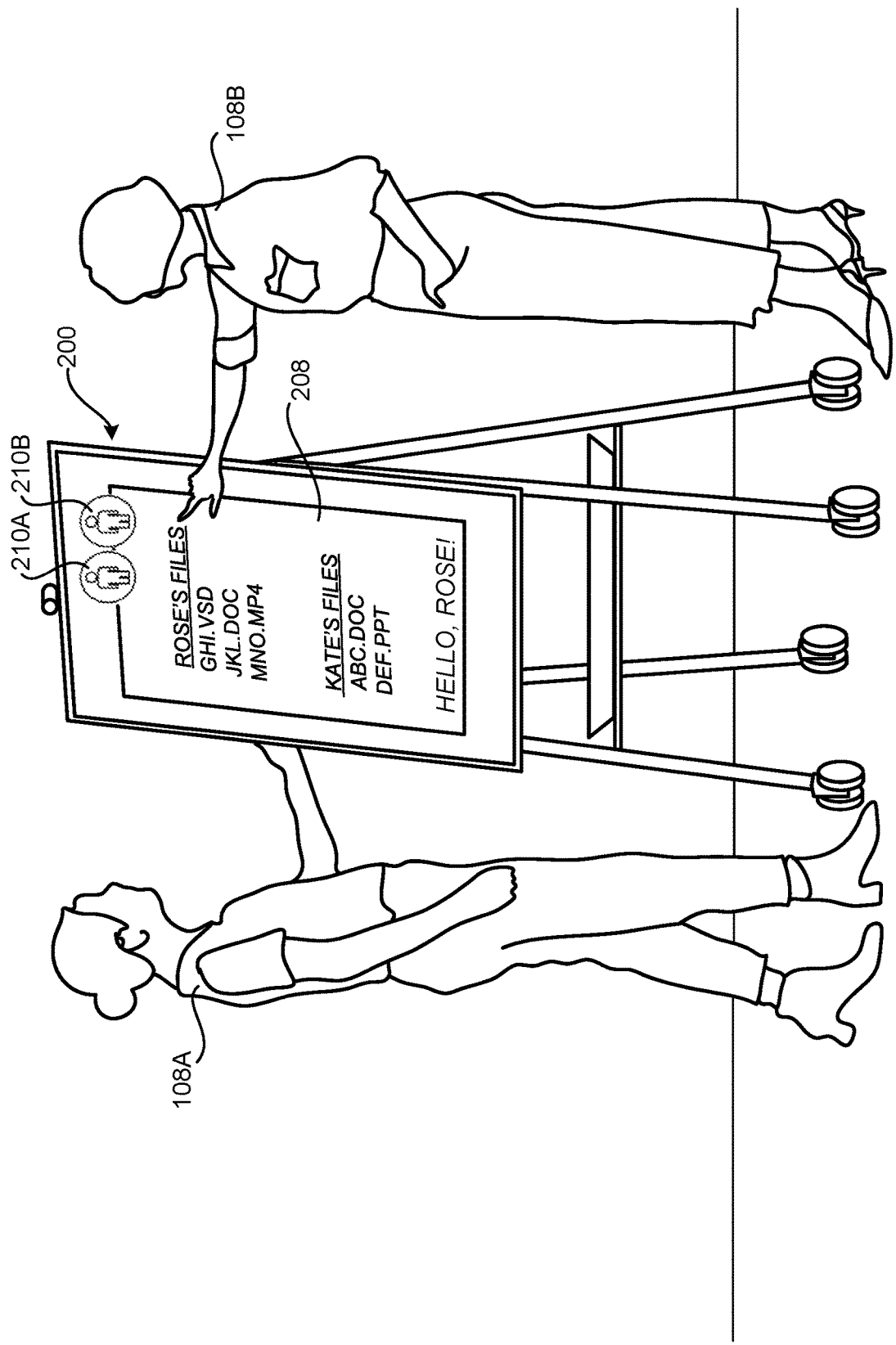

MULTI-USER COMPUTING DEVICE CONFIGURED FOR EXECUTING APPLICATIONS IN MULTIPLE USER CONTEXTS SIMULTANEOUSLY

BACKGROUND

Computing systems supporting multiple simultaneous users ("multi-user computing systems") are commonly utilized in the workplace and other types of environments. For example, a communal computing device, such as an interactive digital whiteboard, might be installed in a conference room of an enterprise. Employees of the enterprise can utilize the communal computing device individually or in collaboration with one another. Such a computing system might be utilized throughout the day by many different employees or groups of employees.

Multi-user computing systems such as those described above typically utilize the concept of an "active" user when multiple users are utilizing the device simultaneously. For instance, a multi-user computing system can identify the current user of the system using a variety of technologies such as facial recognition. Input made to the multi-user computing system is then attributed to that user. If another user begins to utilize the multi-user computing system, that user will be identified as the active user and input to the device will be attributed to that user.

Maintaining the identity of an active user and attributing user input to the active user as described above can cause a number of technical problems. For example, significant processor cycles and memory can be consumed when an operating system ("OS") continually identifies active users and notifies applications of the current active user, particularly when many users are working with a multi-user computing system simultaneously. As another example, a multi-user computing system might identify the active user incorrectly, thereby causing input to be attributed to the wrong user. Processor cycles and memory can then be utilized unnecessarily to identify the correct active user and properly attribute the user input to that user.

Some multi-user computing systems do not utilize the concept of an active user. In these multi-user computing systems, applications are executed in the context of single users and, consequently, only have access to data associated with a single user at a time. As a result, users of these types of multi-user computing systems commonly must share documents for collaboration on a multi-user computing system via email or other file sharing mechanisms. This also unnecessarily utilizes memory, processor cycles, and network bandwidth.

It is with respect to these and other technical challenges that the disclosure made herein is presented.

SUMMARY

Technologies are disclosed herein for executing applications in multiple user contexts simultaneously. The concept of an active user is not utilized by the disclosed technologies, thereby saving computing resources as compared to previous multi-user systems that continually identify and attribute input to active users. Moreover, because applications can execute in multiple user contexts simultaneously using the disclosed technologies, these applications can access multiple users' data simultaneously. The need for users to share documents for collaboration on a multi-user device via email or another external mechanism is thereby eliminated. This can conserve memory, processor cycles, and network bandwidth as compared to previous solutions. Technical benefits not specifically mentioned herein can also be realized through implementations of the disclosed subject matter.

In order to realize the technical benefits mentioned briefly above, and potentially others, a multi-user computing device, such a communal computing device like an interactive digital whiteboard, is configured for execution of both single user aware ("SUA") applications and multi-user aware ("MUA") applications. Instances of SUA applications are executed in the context of a single user and, therefore, are configured to access data associated with only a single authenticated user of a multi-user computing device. Multiple instances of SUA applications can execute simultaneously in different user contexts.

A single instance of a MUA application, on the other hand, can execute in the contexts of multiple authenticated users of the multi-user computing device simultaneously. Consequently, a single instance of a MUA application is capable of computing and delivering experiences for multiple authenticated users of the multi-user computing device simultaneously. In particular, a MUA application can simultaneously access and utilize data associated with multiple authenticated users. This also enables multiple authenticated users of the communal computing device to interact with the MUA application simultaneously. For example, and without limitation, a MUA application can present a graphical user interface ("GUI") that allows all of the authenticated users of a multi-user computing device to retrieve, view, and operate on their own data. The GUI can also include user interface ("UI") elements that identify the currently authenticated users of the communal computing device, such as icons or UI tabs.

In order to provide this functionality, the multi-user computing device is configured to execute a multi-user aware OS platform that allows concurrently authenticated users to engage in a shell experience provided by the OS and application experiences. The multi-user aware OS platform includes functionality for authenticating and de-authenticating users of the multi-user computing device. When users of the multi-user computing device are authenticated, the multi-user aware OS platform can notify executing MUA applications that anew user has been authenticated. In response to receiving such a notification, the MUA applications can begin executing in the context of the newly authenticated user and any other previously authenticated users.

The multi-user aware OS platform can also provide notifications to executing MUA applications when users of the multi-user computing device are de-authenticated. In response to receiving such a notification, the MUA applications stop executing in the context of the de-authenticated user. Data associated with the de-authenticated user is also removed from the multi-user computing device. The MUA applications continue executing in the context of the remaining authenticated users of the multi-user computing device.

As discussed briefly above, implementations of the technologies disclosed herein can reduce the utilization of computing resources, such as memory, processor cycles, and network utilization, as compared to previous multi-user computing systems. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2E are pictorial diagrams showing aspects of an interactive digital whiteboard configured for execution of applications in multiple user contexts simultaneously;

DETAILED DESCRIPTION

Figure 1A:
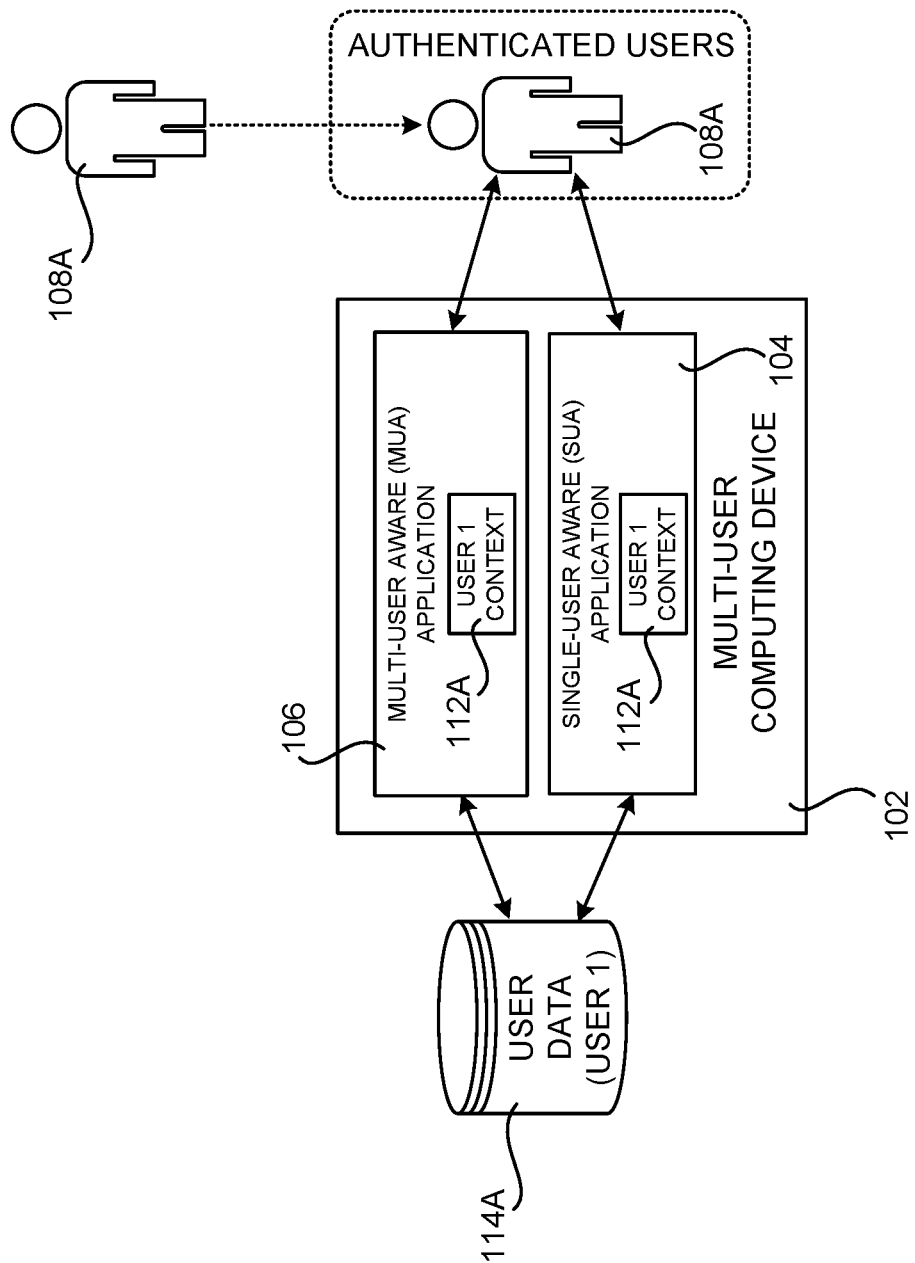
FIGS. 1A-1D are computing architecture diagrams showing aspects of a multi-user computing device configured for execution of applications in multiple user contexts simultaneously.

The following detailed description is directed to technologies for executing applications in multiple user contexts simultaneously. As discussed briefly above, the disclosed technologies do not identify an active user and do not limit application execution to a single user context. As a result, implementations of the disclosed technologies can save computing resources as compared to previous multi-user computing devices. Other technical benefits not specifically mentioned herein can also be realized through implementations of the disclosed subject matter.

In the following detailed description, references are made to the accompanying drawings that form a part hereof, and which are shown by way of illustration specific configurations or examples. Referring now to the drawings, in which like numerals represent like elements throughout the several FIGS., aspects of a multi-user computing device configured for executing applications in user contexts associated with multiple authenticated users simultaneously will be described.

FIGS. 1A-1D are computing architecture diagrams showing aspects of a multi-user computing device 102 configured for execution of applications in multiple user contexts simultaneously. Execution of an application in a user context means that the application can perform operations on behalf of a user using the permissions and access settings associated with the user. For example, an application executing in the context of a user 108A can access user data 114A associated with the user 108A using the permissions and access settings of the user 108A.

The multi-user computing device 102 might, for example, be a communal computing device such as the interactive digital whiteboard shown in FIGS. 2A-2E and described below. In this regard, it is to be appreciated that while an interactive digital whiteboard is utilized herein to illustrate aspects of the disclosed subject matter, those skilled in the art will recognize that the disclosed technologies can be implemented by other types of multi-user computing devices 102 including, but not limited to, hand-held computing devices, consumer electronics, wearable computing devices, automobiles, home automation devices, video game consoles, desktop and laptop computers, tablet computers, and the like.

As shown in FIG. 1A and described briefly above, the multi-user computing device 102 is configured to execute both SUA applications 104 and MUA applications 106. Instances of SUA applications are aware of only one user 108A at a time and, therefore, execute in the context of a single user 108A. As a result, SUA applications 104 can only access user data for a single authenticated user of a multi-user computing device 102. In the example shown in FIG. 1A, for instance, the user 108A has authenticated with the multi-user computing device 102 and executed the SUA application 104. The SUA application 104 executes in the context 112A of the user 108A and, therefore, can only access user data 114A associated with the user 108A. The SUA application 104 cannot access data associated with another user.

In the example shown in FIG. 1A, the user 108A has also executed a MUA application 106. The MUA application 106 executes in the context 112A of the user 108A initially and can access the user data 114A. The MUA application 106 can also execute in the contexts of multiple authenticated users 108 of the multi-user computing device 102 simultaneously. This enables MUA applications 106 to simultaneously access and utilize data associated with multiple authenticated users 108. This is illustrated in FIG. 1B, which continues the example of FIG. 1A.

Figure 1B:
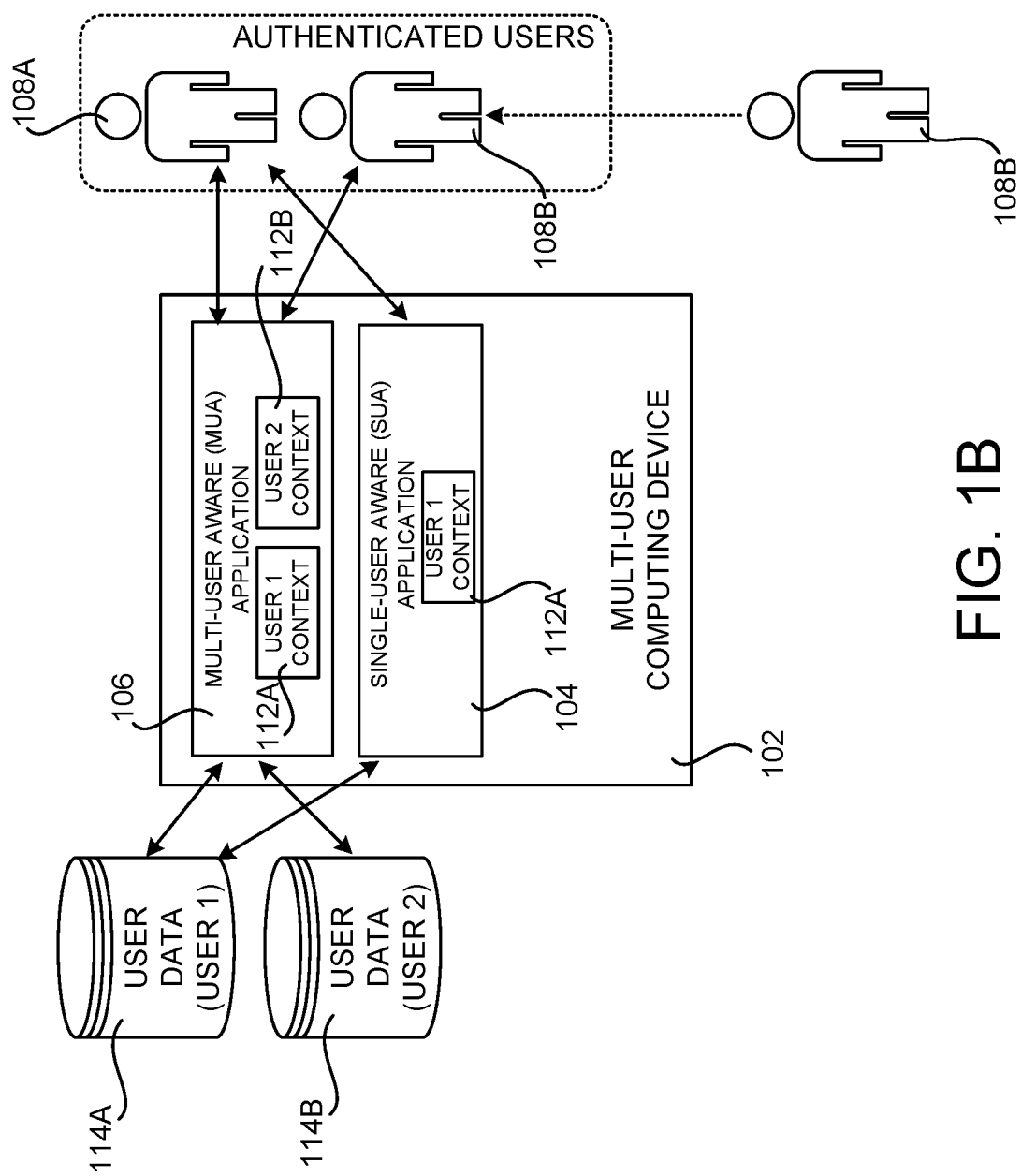

In the example shown in FIG. 1B, another user 108B has authenticated with the multi-user computing device 102. As a result, the MUA application 106 begins executing in the content 112A of the user 108A and the context 112B of the user 108B. The MUA application 106 can, therefore, access user data 114A associated with the user 108A and user data 114B associated with the user 108B.

Figure 1C:
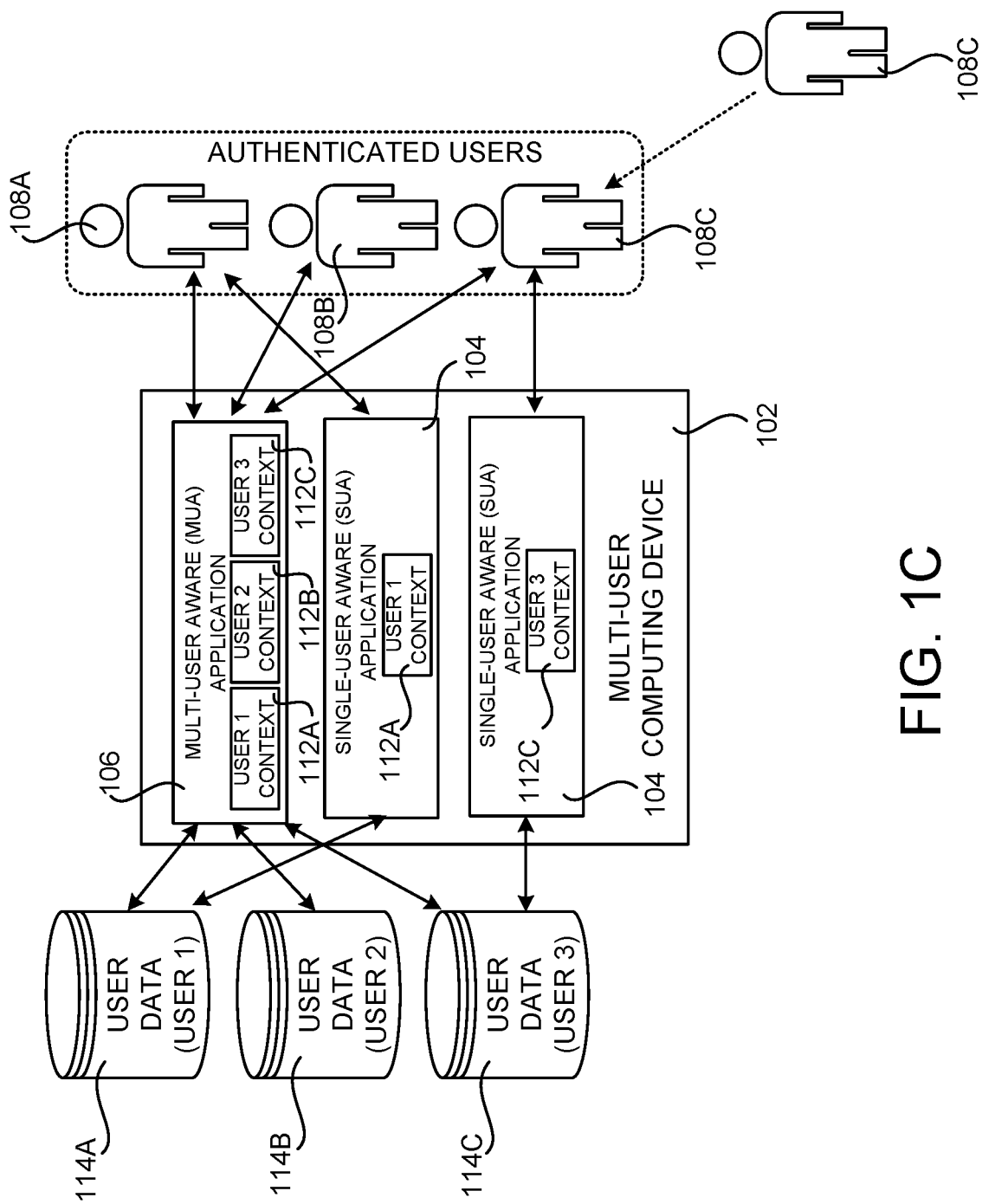
Figure 1D:
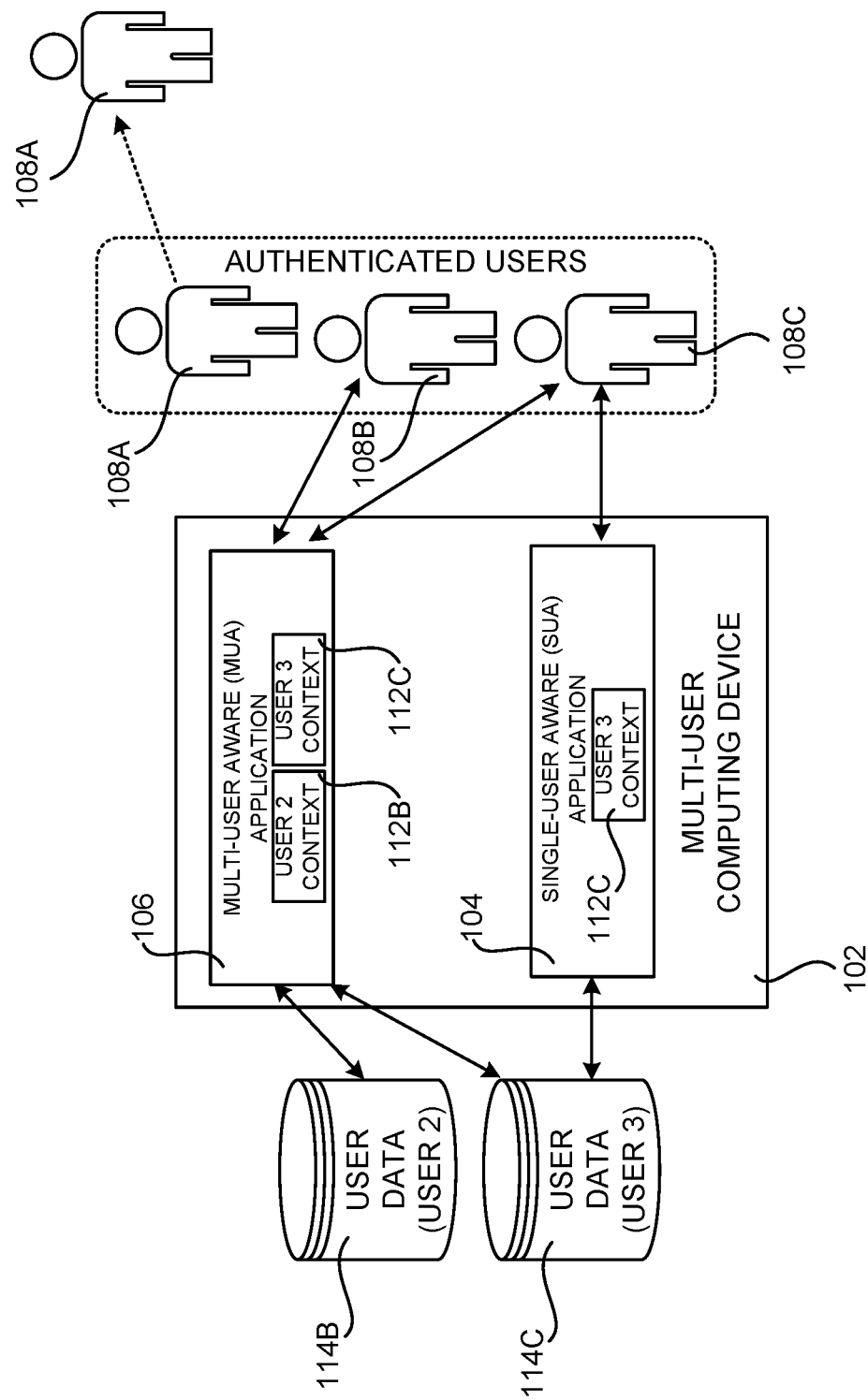

Continuing the example of FIGS. 1A and 1B, FIG. 1C shows another user 108C that has authenticated with the multi-user computing device 102. As a result, the MUA application 106 begins executing in the content 112A of the user 108A, the context 112B of the user 108B, and the context 112C of the user 108C. The MUA application 106 can, therefore, access user data 114A associated with the user 108A, user data 114B associated with the user 108B, and user data 114C associated with the user 108C.

In the example shown in FIG. 1C, the user 108C has also executed another instance of the SUA application 104. The new instance of the SUA application 104 executes in the context 112C of the user 108C and, therefore, can only access user data 114A associated with the user 108A. The SUA application 104 cannot access data associated with the user 108A or the user 108B.

Continuing the example of FIGS. 1A-1C, FIG. 1D shows the user 108A de-authenticating from the multi-user computing device 102. As a result, the MUA application 106 stops executing in the context 112A of the user 108A. The MUA application 106, however, continues executing in the context of the remaining authenticated users 108B and 108C of the multi-user computing device 102. The instance of the SUA application 104 executing in the context 112A of the user 108A is terminated and any data associated with the user 108A that has been stored on the multi-user computing device 102 is removed.

It is to be appreciated that execution of a MUA application 106 in the contexts 112 of multiple authenticated users 108 of the multi-user computing device 102 enables the multiple authenticated users 108 of the multi-user computing device 102 to interact with the MUA application 106 simultaneously. For example, and without limitation, a MUA application 106 can present a GUI (not shown in FIGS. 1A-1D) that allows all of the authenticated users 108 of a multi-user computing device 102 to retrieve, view, and operate on their own user data 114. The GUI can also include user interface ("UI") elements (not shown in FIGS. 1A-1D) that identify the currently authenticated users 108 of the multi-user computing device 102, such as icons or UI tabs.

FIGS. 2A-2E are pictorial diagrams showing aspects of an illustrative multi-user computing device 102 and the functionality that it provides. In the example illustrated in FIGS. 2A-2E, the multi-user computing device 102 is an interactive digital whiteboard 200. The illustrative interactive digital whiteboard 200 shown in FIGS. 2A-2E includes a roller-stand-mounted display 202A and four wall-mounted displays 202B-202E. The interactive digital whiteboard 200 also includes three video cameras 204A-204C. The video cameras 204A-204C can be utilized to recognize users of the interactive digital whiteboard 200, for videoconferencing, and for other purposes.

The interactive digital whiteboard 200 also includes a computer 206, which might be interfaced to various hardware components such as, but not limited to, a microphone array, ambient light and infrared presence sensors, fingerprint sensors, the displays 202A-202E, the video cameras 204A-204C, wired and wireless networking devices, and other input devices and hardware components. The computer 206 also includes one or more general-purpose processors, graphics processors, memory, and volatile and non-volatile storage devices. The computer 206 can support execution of a multi-user aware OS platform, SUA applications 104, and MUA applications 106 as described herein.

Figure 2A:
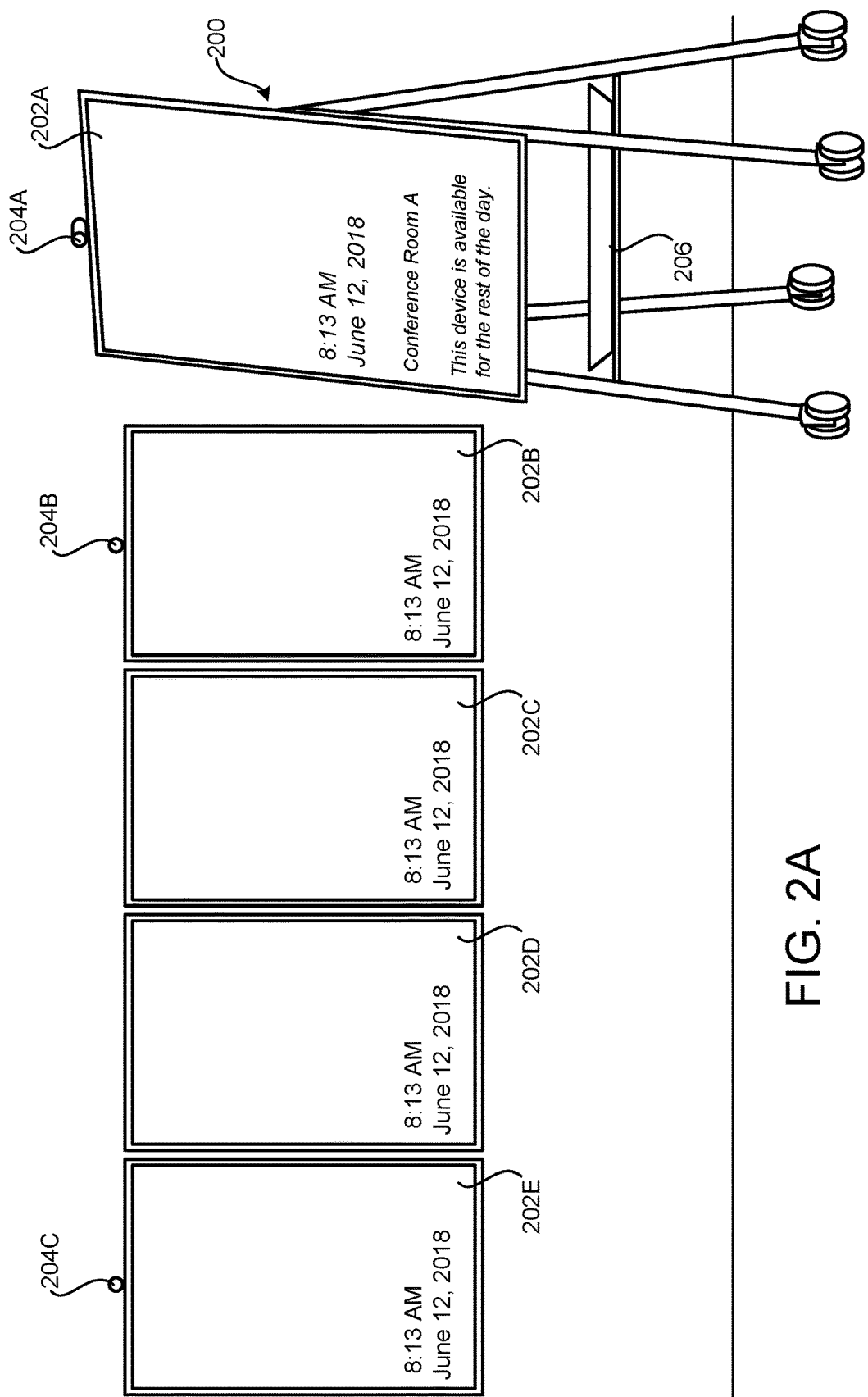
Figure 2B:
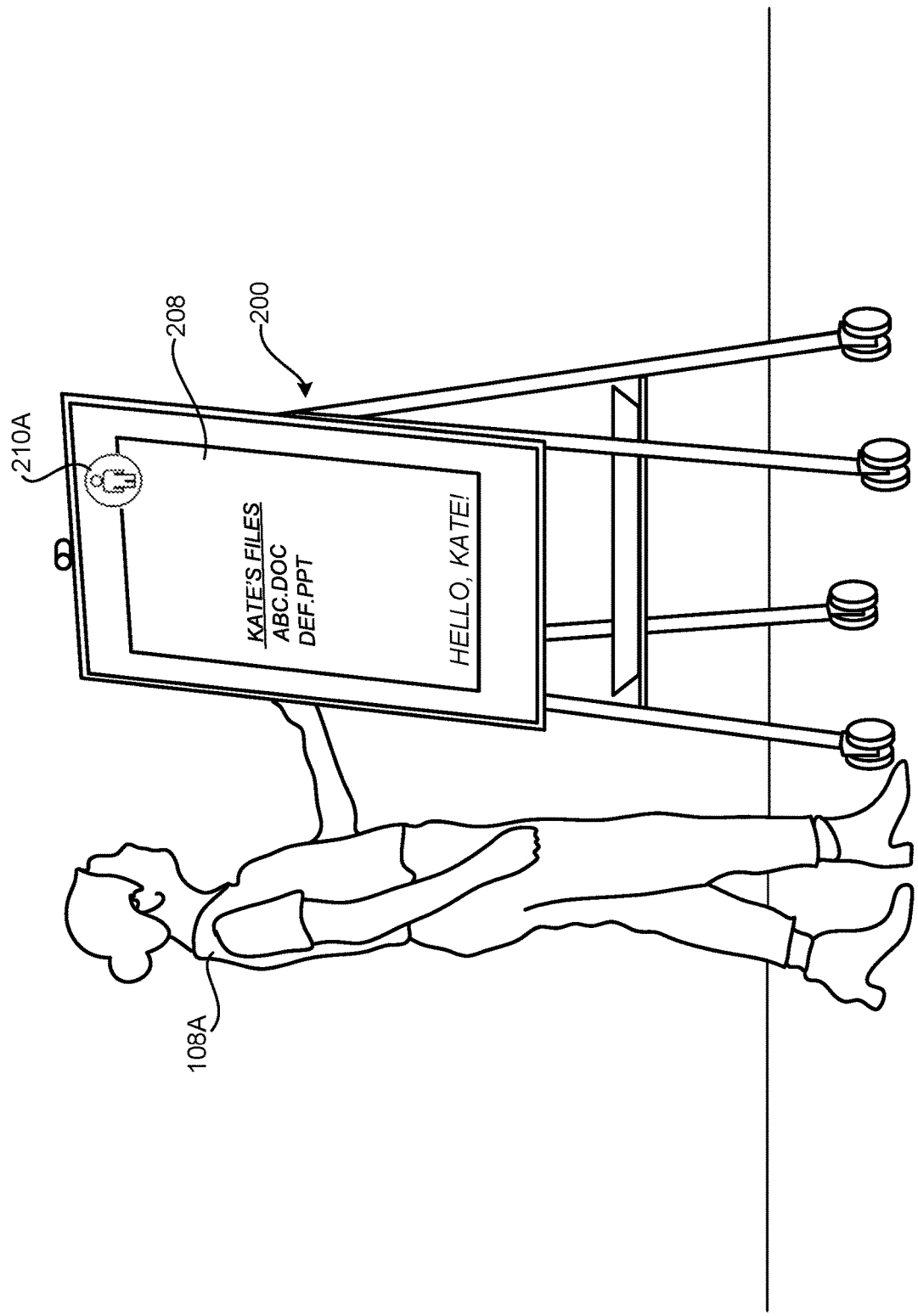

In the example shown in FIG. 2B, a user 108A has authenticated with the interactive digital whiteboard 200 such as, for example, by placing her finger on a fingerprint reader on the side of the interactive digital whiteboard 200. Once the user 108A has been authenticated, the interactive digital whiteboard 200 can present a GUI through which the user 108A can perform various functions including, but not limited to, executing SUA applications 104 and MUA applications 106. In this example, the user 108A has executed a MUA application 106 which, in turn, has generated a GUI 208 on the interactive digital whiteboard 200.

The GUI 208 shown in FIG. 2B includes an icon 210A, or another type of visual element such as a page tab, that indicates that the MUA application 106 is executing in the context of the user 108A. The icon 210A might, for example, present a picture of the user 108A. Because the MUA application 106 executes in the context 112A of the user 108A, the MUA application 106 can access the user data 114A associated with the user 108A. In this example the MUA application 106 has accessed files associated with the user 108A and presented the names of the files in the GUI 208.

As discussed above, a MUA application 106 can execute in the contexts 112 of multiple authenticated users 108 of the multi-user computing device 102 simultaneously. This enables MUA applications 106 to simultaneously access and utilize data associated with multiple authenticated users 108. This is illustrated in FIG. 2C, which continues the example of FIGS. 2A and 2B.

In the example shown in FIG. 2C, another user 108B has authenticated with the interactive digital whiteboard. As a result, the MUA application 106 begins executing in the content 112A of the user 108A and the context 112B of the user 108B. The MUA application 106 can, therefore, access user data 114A associated with the user 108A and user data 114B associated with the user 108B.

In the example shown in FIG. 2C, the GUI 208 has been updated to present an icon 210B, or another type of visual element such as a page tab, that indicates that the MUA application 106 is now also executing in the context of the user 108B. The icon 210B might, for example, present a picture of the user 108B.

Because the MUA application 106 executes in the context 112A of the user 108A and in the context 112B of the user 108B simultaneously, the MUA application 106 can access the user data 114 associated with both users 108. In this example the MUA application 106 has additionally accessed files associated with the user 108B and presented the names of the files in the GUI 208 in conjunction with the presentation of the names of the files associated with the user 108A.

Executing the MUA application 106 in the contexts 112 of multiple authenticated users 108 simultaneously (e.g. the users 108A and 108B) also enables multiple authenticated users 108 of the interactive digital whiteboard 200 to interact with the MUA application 106 simultaneously. For example, and without limitation, the GUI 208 provided by the interactive digital whiteboard 200 can enable all of the authenticated users 108 of the interactive digital whiteboard to retrieve, view, and operate on their own user data 114 simultaneously. In the example shown in FIG. 2C, for instance, the user 108A can open, view, edit, and share their user data 114A at the same time the user 108B is opening, viewing, editing, or sharing their user data 114B.

Figure 2D:
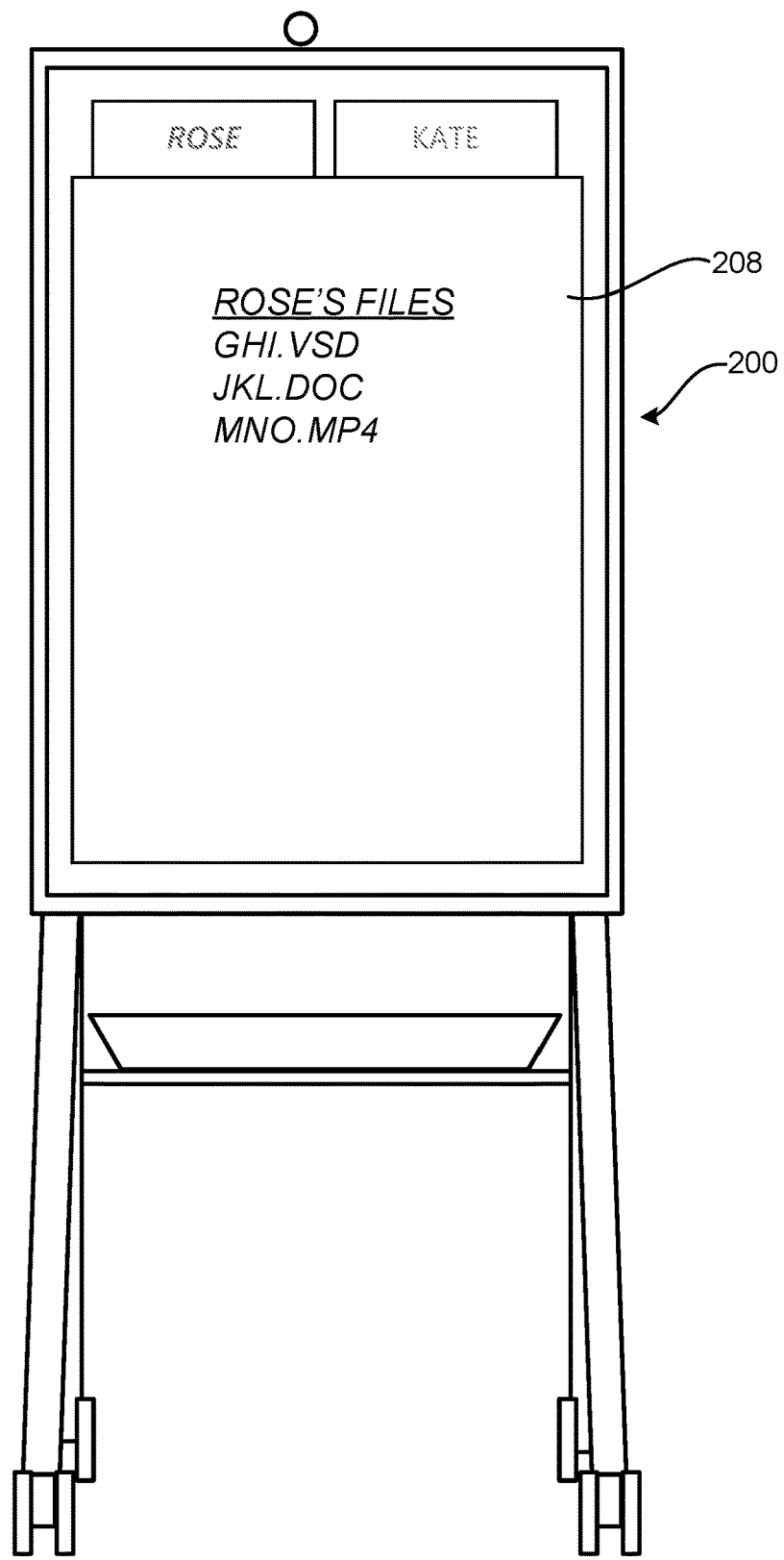
Figure 2E:
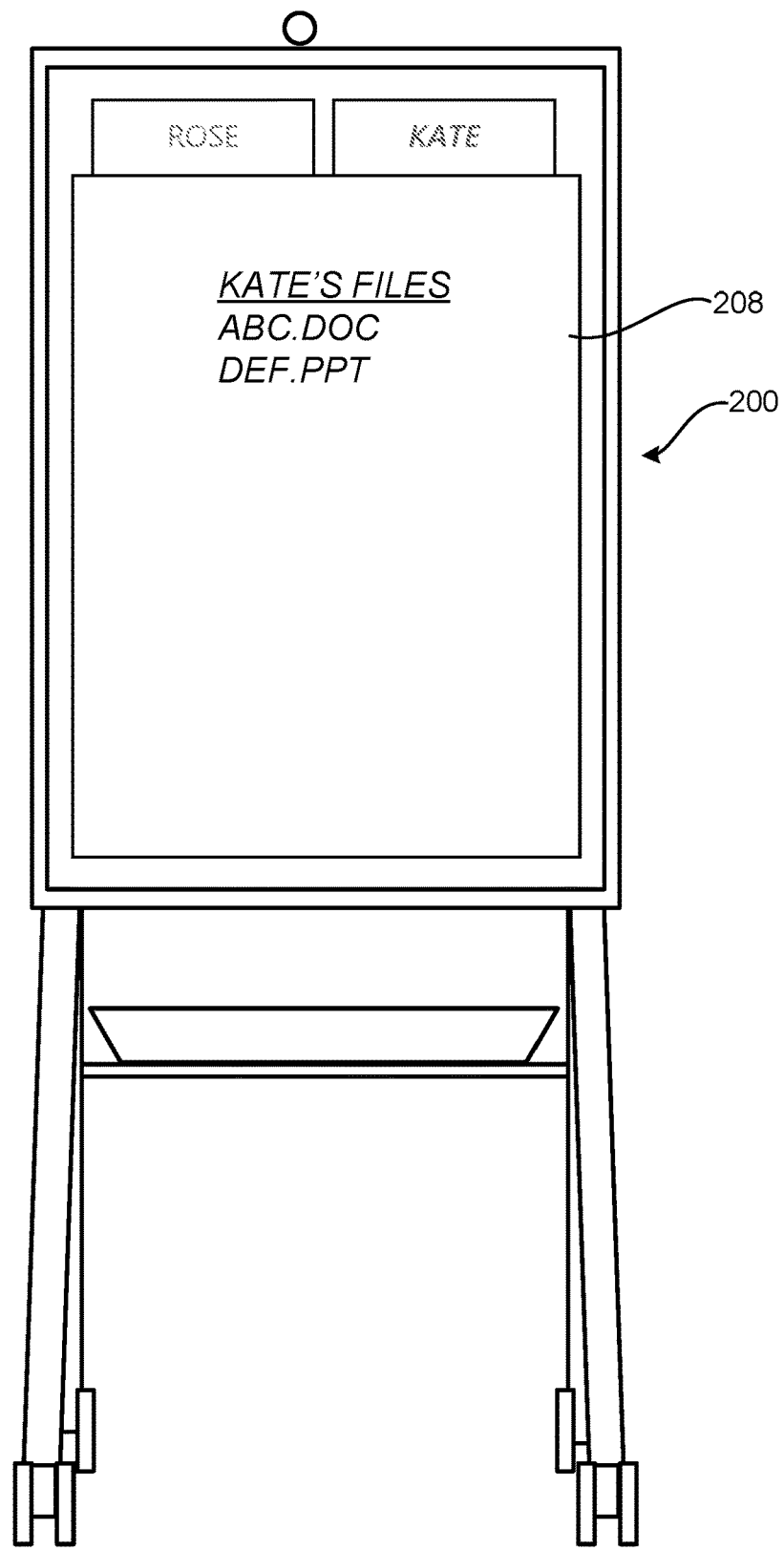

In the example of FIGS. 2D and 2E, a tabbed GUI has been provided for presenting user data 114 associated with multiple simultaneous users 108 (e.g. Rose and Kate) of the multi-user computing device. In the example shown in FIG. 2D, for instance, a GUI 208 is presented that includes a tab for the user "Rose" and a tab for the user "Kate." In this example, the tab for "Rose" has been selected and, accordingly, the user data 114 associated with "Rose" is presented in the GUI. In the example shown in FIG. 2E, the tab for the "Kate" has been selected and, accordingly, the user data 114 associated with "Kate" is presented in the GUI 208.

Figure 3B:
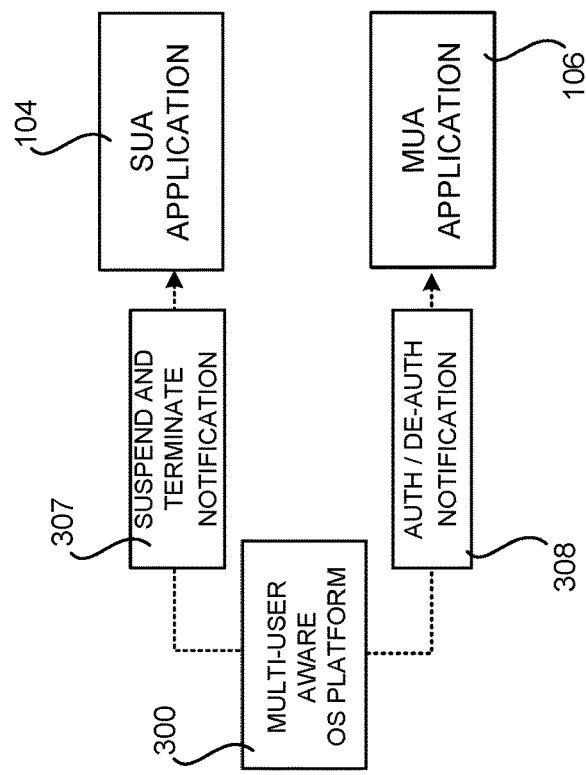
FIGS. 3A and 3B are computing architecture diagrams showing further aspects of the multi-user computing device shown in FIGS. 1A-1D.
Figure 3A:
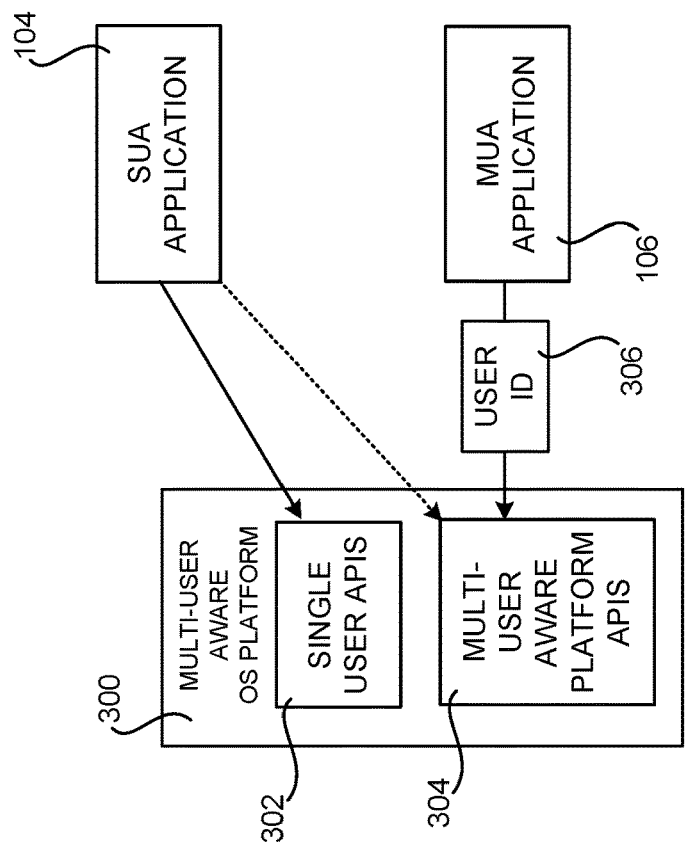

FIGS. 3A and 3B are computing architecture diagrams showing further aspects of the multi-user computing device 102 shown in FIGS. 1A-1D. As illustrated in FIG. 3A, the multi-user computing device 102 can be configured to execute a multi-user aware OS platform 300 that provides aspects of the functionality disclosed herein. For example, the multi-user aware OS platform 300 can provide single user application programming interfaces ("APIs") 302 and multi-user aware platform APIs 304.

SUA applications 104 utilize the single user APIs 302 to perform tasks on behalf of users 108 such as, for example, retrieving user data 114A for a user 108A. Because SUA applications 104 are executed in the context 112 of only a single user 108, calls to the single user APIs 302 do not need to specifically identify a user for which a task is to be performed. Rather, the user for which a task is to be performed is typically inferred from the user context 112 in which the calling SUA application 104 is executing.

MUA applications 106 utilize the multi-user aware platform APIs 304 to perform tasks on behalf of users 108 such as, for example, retrieving user data 114A for a user 108A. In some configurations, MUA applications 106 are executed using a default account that is not associated with any user. As a result, MUA applications 106 provide a user identifier ("ID") 306 of a user 108 for which a task is to be performed when calling the multi-user aware platform APIs 304 (e.g. a ForUser(*) parameter). In the example described above with regard to FIGS. 2A-2E, for instance, the MUA application 106 can provide a user ID 306 for the user 108A when calling the multi-user aware platform APIs 304 to access or otherwise operate on the user data 114A. Similarly, the MUA application 106 can provide a user ID 306 for the user 108B when calling the multi-user aware platform APIs 304 when accessing or otherwise operating on the user data 114B.

The multi-user aware OS platform 300 also includes functionality for authenticating and de-authenticating users 108 of the multi-user computing device 102. Various mechanisms can be utilized to authenticate users 108 such as, but not limited to, facial recognition, fingerprint recognition, passwords, personal ID numbers ("PINs"), and others. Users 108 of the multi-user computing device 102 can de-authenticate manually (e.g. by manually signing out of the multi-user computing device 102) or can be de-authenticated automatically by the device 102, such as in response to a user 108 leaving the vicinity of the multi-user computing device 102.

When users 108 of the multi-user computing device 102 are authenticated, the multi-user aware OS platform 300 can provide a notification 308 to executing MUA applications 106 and, and to executing SUA applications 104 in some configurations, indicating that a new user 108 has been authenticated. In response to receiving such a notification, the MUA applications 106 can begin executing in the context 114 of the newly authenticated user 108 and any other previously authenticated users 108.

The multi-user aware OS platform 300 can also provide notifications 308 to executing MUA applications 106 when users 108 of the multi-user computing device 102 are de-authenticated. In response to receiving such a notification, the MUA applications 106 stop executing in the context 112 of the de-authenticated user 108. Data associated with the de-authenticated user 108 is also removed from the multi-user computing device 102. The MUA applications 106 continue executing in the contexts 112 of the remaining authenticated users 108 of the multi-user computing device 102. SUA applications 104 can store user data 114 and terminate execution in response to receiving a notification 307.

Figure 4A:
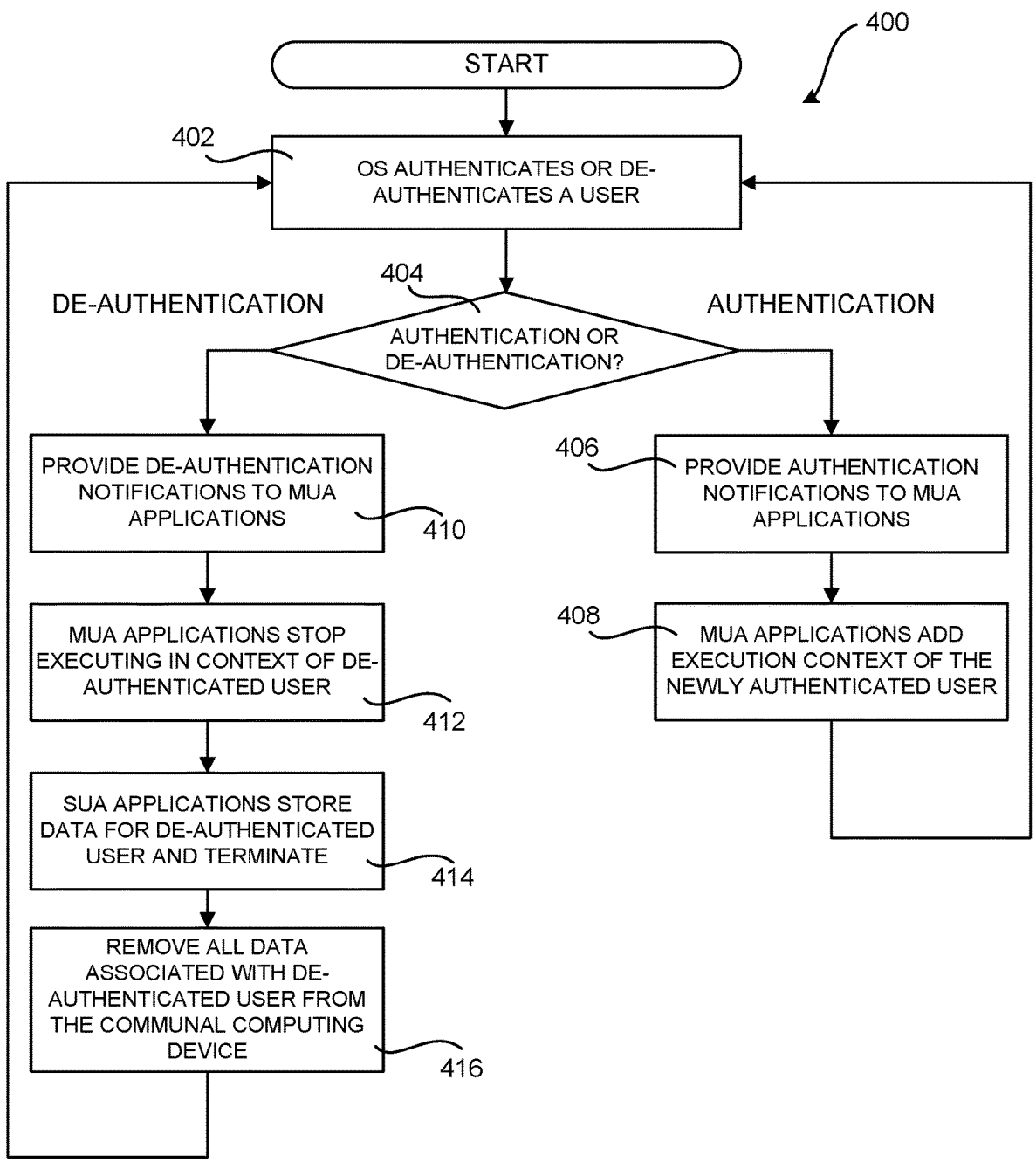
FIG. 4A is a flow diagram showing a routine that illustrates aspects of the operation of the multi-user computing device described with reference to FIGS. 1A-1D, 3A, and 3B for processing notifications of user authentication and de-authentication.

FIG. 4A is a flow diagram showing a routine 400 that illustrates aspects of the operation of the multi-user computing device 102 described above with reference to FIGS. 1-3B for processing notifications of user authentication and de-authentication, according to one embodiment disclosed herein. It should be appreciated that the logical operations described herein with regard to FIG. 4A, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 400 begins at operation 402, where the multi-user aware OS platform 300 authenticates or de-authenticates a user 108. If a user 108 has been authenticated, the routine 400 proceeds from operation 404 to operation 406. At operation 406, the multi-user aware OS platform 300 provides notifications 308 of the authentication to executing MUA applications 106. In response to receiving the notifications 308, the MUA applications 106 begin executing in the context 112 of the newly authenticated user 108 in addition to any other users 108 currently authenticated with the device 102 at operation 408. From operation 408, the routine 400 proceeds back to operation 402 where additional user authentications and de-authentications can be processed.

If a user 108 of the device 102 has been de-authenticated, the routine 400 proceeds from operation 404 to operation 410. At operation 410, the multi-user aware OS platform 300 provides notifications 308 indicating that a user 108 has been de-authenticated to the MUA applications 106. Notifications 307 can also be provided to SUA applications 104 instructing these applications to suspend execution and terminate. The routine 400 then proceeds from operation 410 to operation 412, where the MUA applications 106 stop executing in the context 112 of the de-authenticated user 108.

From operation 412, the routine 400 proceeds to operation 414, where the SUA applications 104 store user data 114 for the de-authenticated user 108 and terminate their execution. From operation 416, any user data 114 associated with the de-authenticated user 108 that has been stored on the device 102 can be removed. In this regard, it is to be appreciated the user data 114 can be preserved on the device 102 if the de-authenticated user 108 commonly users the device. In this way, the data 114 can be made available to the user 108 the next time they authenticate with the device. This data is not, however, available to any applications after the user de-authenticates. The routine 400 then proceeds back to operation 402, where additional user authentications and de-authentications can be processed.

It is to be appreciated that a MUA application 106 can continue executing even after the last user 108 of the multi-user computing device 102 has de-authenticated in some configurations. A MUA application can continue running until a new user 108 authenticates (at which time it will begin executing in the context of that user as described above), a non-authenticated user 108 causes the MUA application 106 to terminate such as, for instance, through a UI gesture, or the MUA application 106 terminates based upon its own policy settings due to all users having de-authenticated.

Figure 4B:
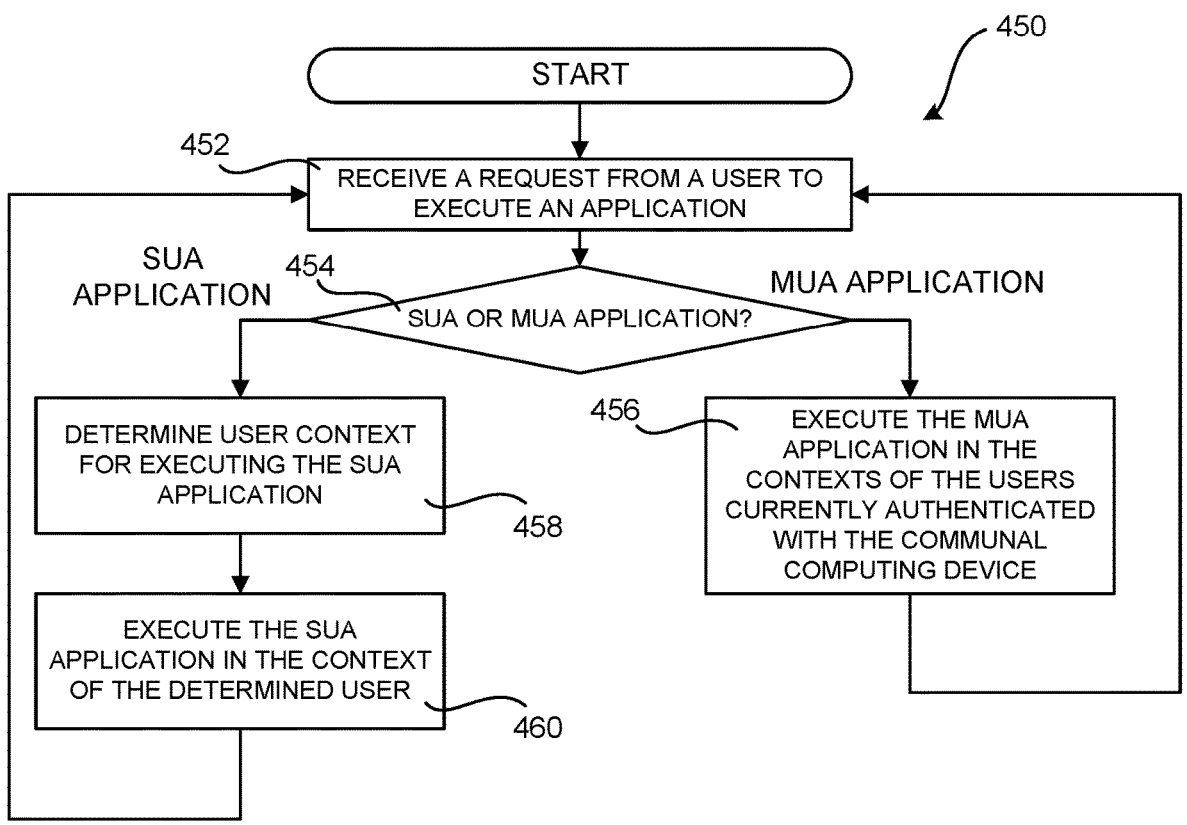
FIG. 4B is a flow diagram showing a routine that illustrates aspects of the operation of the multi-user computing device described with reference to FIGS. 1A-1D, 3A, and 3B for processing requests to execute single user aware and multi-user aware applications.

FIG. 4B is a flow diagram showing a routine 450 that illustrates aspects of the operation of the multi-user computing device 102 described above with reference to FIGS. 1-3B for processing requests to execute SUA applications 104 and MUA applications 106. The routine 450 starts at operation 452, where a request is received from a user 108 to execute a SUA application 104 or a MUA application 106. If the request is to execute a SUA application 104, the routine 450 proceeds to operation 458. At operation 458, the user context 112 for executing the SUA application 104 is determined. For example, the multi-user aware OS platform 300 might provide a GUI for identifying the user 108 executing the SUA application 104. The routine 450 then proceeds from operation 458 to operation 460, where the SUA application 104 is executed in the context 112 of the identified user 108. The routine 450 then proceeds back to operation 452, where additional requests to execute applications can be processed.

If the request received at operation 452 is a request to execute a MUA application 106, the routine 450 proceeds to operation 456. At operation 456, the MUA application is executed in the contexts 112 of all of the users 108 currently authenticated with the multi-user computing device 102. The routine 450 then proceeds back to operation 452, where additional requests to execute applications can be processed.

Figure 5:
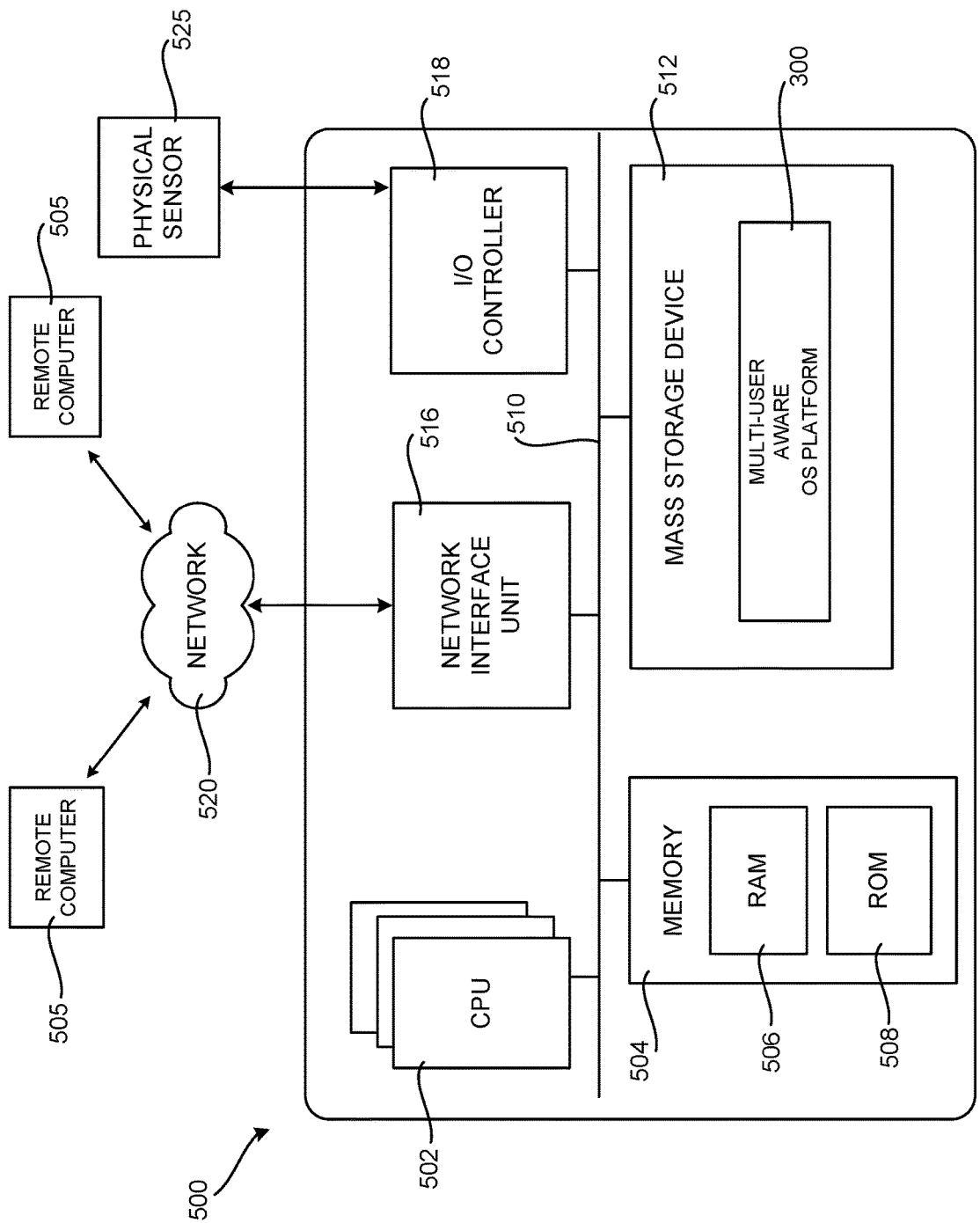
FIG. 5 is a computer architecture diagram showing an illustrative computer hardware and software architecture for a computing device that can implement aspects of the technologies presented herein.

FIG. 5 is a computer architecture diagram showing an illustrative computer hardware and software architecture for a computing device that can implement the various technologies presented herein. In particular, the architecture illustrated in FIG. 5 can be utilized to implement a multi-user computing device 102 such as an interactive digital whiteboard 200, server computer, mobile phone, e-reader, smartphone, desktop or laptop computer, AR/VR device, tablet computer, video game console, or another type of multi-user computing device.

The computer 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system ("BIOS" or "firmware") containing the basic routines that help to transfer information between elements within the computer 500, such as during startup, can be stored in the ROM 508. The computer 500 further includes a mass storage device 512 for storing a multi-user aware OS platform 300, application programs, such as the SUA applications 104 and the MUA applications 106, and other types of programs. The mass storage device 512 can also be configured to store other types of programs and data.

The mass storage device 512 is connected to the CPU 502 through a mass storage controller (not shown) connected to the bus 510. The mass storage device 512 and its associated computer readable media provide non-volatile storage for the computer 500. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 500. For purposes of the claims, the phrase "computer storage medium," and variations thereof, does not include waves or signals per se or communication media.

According to various configurations, the computer 500 can operate in a networked environment using logical connections to remote computers through a network such as the network 520. The computer 500 can connect to the network 520 through a network interface unit 516 connected to the bus 510. It should be appreciated that the network interface unit 516 can also be utilized to connect to other types of networks and remote computer systems. The computer 500 can also include an input/output controller 518 for receiving and processing input from a number of other devices, including a keyboard, mouse, touch input, an electronic stylus (not shown in FIG. 5), or a physical sensor such as a video camera or fingerprint reader. Similarly, the input/output controller 518 can provide output to a display screen or other type of output device (also not shown in FIG. 5).

It should be appreciated that the software components described herein, when loaded into the CPU 502 and executed, can transform the CPU 502 and the overall computer 500 from a general-purpose computing device into a special-purpose computing device customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the architecture shown in FIG. 5 for the computer 500, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 500 might not include all of the components shown in FIG. 5, can include other components that are not explicitly shown in FIG. 5, or can utilize an architecture completely different than that shown in FIG. 5.

Figure 6:
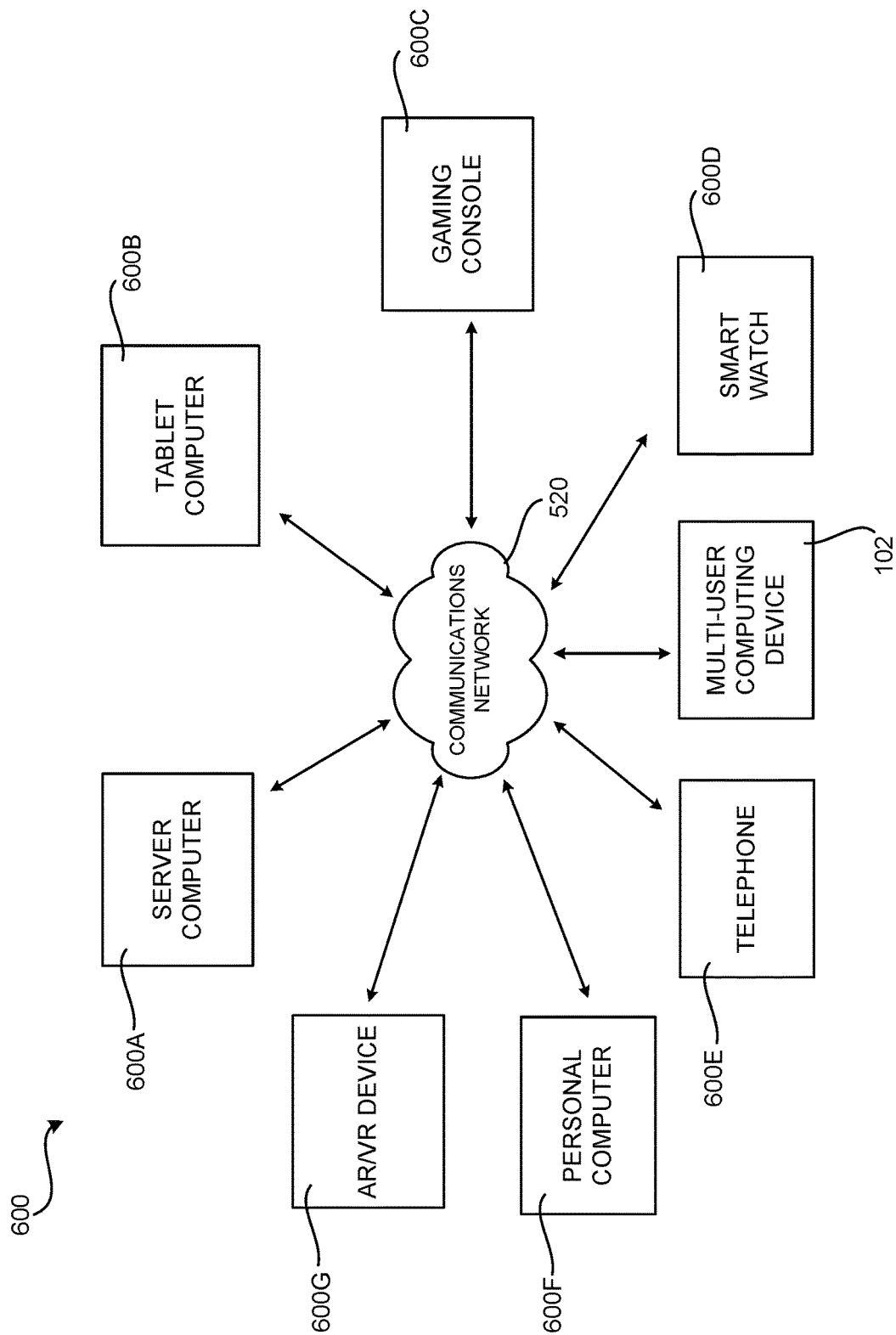
FIG. 6 is a network diagram illustrating a distributed computing environment in which aspects of the disclosed technologies can be implemented.

FIG. 6 is a network diagram illustrating a distributed network computing environment 600 in which aspects of the disclosed technologies can be implemented, according to various embodiments presented herein. As shown in FIG. 6, one or more server computers 600A can be interconnected via a communications network 520 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a multi-user computing device 102, tablet computer 600B, gaming console 600C, smartwatch 600D, telephone 600E, such as a smartphone, a personal computer 600F, and an AR/VR device 600G.

In a network environment in which the communications network 520 is the Internet, for example, the server computer 600A can be a dedicated server computer operable to process and communicate data to and from the client computing devices 600B-600G and the multi-user computing device 102 via any of a number of known protocols, such as, hypertext transfer protocol ("HTTP"), file transfer protocol ("FTP"), or simple object access protocol ("SOAP"). Additionally, the networked computing environment 600 can utilize various data security protocols such as secured socket layer ("SSL") or pretty good privacy ("PGP"). Each of the client computing devices 600B-600G and the multi-user computing device 102 can be equipped with an operating system operable to support one or more computing applications or terminal sessions such as a web browser (not shown in FIG. 6), or other graphical user interface (not shown in FIG. 6), or a mobile desktop environment (not shown in FIG. 6) to gain access to the server computer 600A.

The server computer 600A can be communicatively coupled to other computing environments (not shown in FIG. 6) and receive data regarding a participating user's interactions/resource network. In an illustrative operation, a user (not shown in FIG. 6) may interact with a computing application running on a client computing device 600B-600G and the multi-user computing device 102 to obtain desired data and/or perform other computing applications.

The data and/or computing applications may be stored on the server 600A, or servers 600A, and communicated to cooperating users through the client computing devices 600B-600G and the multi-user computing device 102 over an exemplary communications network 520. A participating user (not shown in FIG. 6) may request access to specific data and applications housed in whole or in part on the server computer 5800A. These data may be communicated between the client computing devices 600B-600G and the multi-user computing device 102 and the server computer 600A for processing and storage.

The server computer 600A can host computing applications, processes and applets for the generation, authentication, encryption, and communication of data and applications, and may cooperate with other server computing environments (not shown in FIG. 6), third party service providers (not shown in FIG. 6), network attached storage ("NAS") and storage area networks ("SAN") to realize application/data transactions.

It should be appreciated that the computing architecture shown in FIG. 5 and the distributed network computing environment shown in FIG. 6 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: executing an instance of a single user aware (SUA) application in the context of a single authenticated user of a communal computing device, the SUA application configured to utilize data associated with the single authenticated user of the communal computing device; and executing an instance of a multi-user aware (MUA) application in the contexts of a plurality of authenticated users of the communal computing device, the MUA application configured to simultaneously utilize data associated with the plurality of authenticated users of the communal computing device, and enable the plurality of authenticated users of the communal computing device to interact with the MUA application simultaneously.

Clause 2. The computer-implemented method of clause 1, further comprising: receiving an indication that a new user has joined the plurality of authenticated uses of the communal computing device; and responsive to receiving the indication, providing a notification to the MUA application, whereby the MUA application executes in the context of the plurality of authenticated users of the communal computing device, including the new user.

Clause 3. The computer-implemented method of any of clauses 1 or 2, further comprising: receiving an indication that a user of the plurality of users of the communal computing device has been de-authenticated by the communal computing device; and responsive to receiving the indication, providing a notification to the MUA application, whereby the MUA application executes in the context of one or more remaining users of the plurality of authenticated users of the communal computing device.

Clause 4. The computer-implemented method of any of clauses 1-3, further comprising: responsive to receiving the indication, removing data associated with the de-authenticated user from the communal computing device.

Clause 5. The computer-implemented method of any of clauses 1-4, further comprising: executing an instance of a second single SUA application in the context of a single second authenticated user of the communal computing device, the SUA application configured to utilize data associated with the second authenticated user of the communal computing device.

Clause 6. The computer-implemented method of any of clauses 1-5, wherein the MUA application is configured to present a graphical user interface (GUI) comprising the data associated with the plurality of authenticated users of the communal computing device.

Clause 7. The computer-implemented method of any of clauses 1-6, wherein the GUI further comprises user interface (UI) elements identifying each of the plurality of authenticated users of the communal computing device.

Clause 8. A computing device comprising: one or more processors; and at least one computer storage medium having computer executable instructions stored thereon which, when executed by the one or more processors, cause the computing device to: receive a notification that a first user has authenticated with the computing device; responsive to receiving the notification, cause an instance of a multi-user aware (MUA) application to be executed in a context of the first user; receive a notification that a second user has authenticated with the computing device; and responsive to receiving the notification, cause the instance of the MUA application to be executed in the context of the first user and in a context of the second user.

Clause 9. The computing device of clause 8, wherein the MUA application is configured to process data associated with the first user and the second user of the computing device simultaneously and to process simultaneous input from the first user and the second user of the computing device.

Clause 10. The computing device of any of clauses 8 or 9, wherein the at least one computer storage medium has further computer executable instructions stored thereon to: execute an instance of a single user aware (SUA) application in the context of the first user of the computing device, the SUA application configured to utilize data associated with the first user of the computing device.

Clause 11. The computing device of any of clauses 8-10, wherein the at least one computer storage medium has further computer executable instructions stored thereon to: receive a notification that the first user of the computing device has been de-authenticated; and responsive to receiving the notification, cause the instance of the MUA application to be executed in only the context of the second user.

Clause 12. The computing device of any clauses 8-11, wherein the at least one computer storage medium has further computer executable instructions stored thereon to: remove data associated with the first user from the computing device responsive to receiving the notification that the first user of the computing device has been de-authenticated.

Clause 13. The computing device of any of clauses 8-12, wherein the MUA application is configured to present a graphical user interface (GUI) comprising data associated with the first user of the computing device and data associated with the second user of the computing device.

Clause 14. The computing device of any of clauses 8-13, wherein an instance of a single user aware (SUA) application executes on the computing device, the SUA application configured to utilize one or more application programming interfaces (APIs), and wherein calls by the instance of the SUA application to the APIs are made on behalf of the first user.

Clause 15. The computing device of any of clauses 8-14, wherein the instance of the MUA application is configured to utilize one or more multi-user aware application programming interfaces (APIs), and wherein calls by the instance of the MUA application to the multi-user aware APIs are made on behalf of the first user or the second user.

Clause 16. At least one computer storage medium having computer executable instructions stored thereon which, when executed by one or more processors, cause a computing device to: receive a notification that a first user (108A) has authenticated with the computing device; responsive to receiving the notification, cause an instance of a multi-user aware (MUA) application to be executed in a context of the first user; receive an indication that a second user has authenticated with the computing device; and responsive to receiving the indication, cause the instance of the MUA application to be executed in the context of the first user and in a context of the second user.

Clause 17. The at least one computer storage medium of clause 16, wherein the MUA application is configured to process data associated with the first user and the second user of the computing device simultaneously and to process simultaneous input received from the first user and the second user of the computing device.

Clause 18. The at least one computer storage medium of any of clauses 16 or 17, having further computer executable instructions stored thereon to: execute an instance of a single user aware (SUA) application in the context of the first user of the computing device, the SUA application configured to utilize data associated with the first user of the computing device.

Clause 19. The at least one computer storage medium of any of clauses 16-18, having further computer executable instructions stored thereon to: receive an indication that the first user of the computing device has been de-authenticated; and responsive to receiving the indication, cause the instance of the MUA application to be executed in the context of the second user only, and remove data associated with the first user from the computing device.

Clause 20. The at least one computer storage medium of any of clauses 16-19, wherein the MUA application is configured to present a graphical user interface (GUI) comprising data associated with the first user of the computing device and data associated with the second user of the computing device.

Based on the foregoing, it should be appreciated that technologies for executing applications in multiple user contexts simultaneously have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   executing a first single user application associated with a first authenticated user of a communal computing device, wherein the first single user application includes a first user context associated with the first authenticated user;
   receiving a first request to retrieve data or settings associated with the first authenticated user, wherein the first request does not include identification information for the first authenticated user;
   in response to receiving the first request, invoking a single user application program interface, configured on the communal computing device, that infers an identity of the first authenticated user from the first user context included in the first single user application;
   retrieving, via the single user application program interface, the data or the settings associated with the first authenticated user;
   executing a second single user application associated with a second authenticated user of the communal computing device, wherein the second single user application is executed simultaneously with the first single user application and the second single user application includes a second user context associated with the second authenticated user;
   receiving a second request to retrieve data or settings associated with the second authenticated user, wherein the second request does not include identification information for the second authenticated user;
   in response to receiving the second request, invoking the single user application program interface that infers an identity of the second authenticated user from the second user context included in the second single user application;
   retrieving, via the single user application program interface, the data or the settings associated with the second authenticated user; and
   executing a multi-user aware application in the first user context and the second user context, wherein the multi-user aware application is configured to retrieve (i) the data or the settings associated with the first authenticated user and (ii) the data or the settings associated with the second authenticated user.

2. The computer-implemented method of claim 1, further comprising:
   receiving an indication that the first authenticated user has been de-authenticated by the communal computing device;
   responsive to receiving the indication, providing a notification to the first single user application thereby causing the first single user application to terminate execution; and
   denying subsequent requests for access to the data or the settings associated with the first de-authenticated user.

3. The computer-implemented method of claim 2, further comprising responsive to receiving the indication, removing data associated with the first de-authenticated first user from the communal computing device.

4. A computing device comprising:
   one or more processors; and
   at least one computer storage medium having computer executable instructions stored thereon which, when executed by the one or more processors, cause the computing device to:
   authenticate a first user with the computing device;
   notify a multi-user aware application that the first user has authenticated with the computing device, wherein the multi-user aware application is configured to execute in contexts of multiple authenticated users;
   authenticate a second user with the computing device;
   notify the multi-user aware application that the second user has authenticated with the computing device;
   receive a request from the multi-user aware application to invoke a multi-user aware platform application program interface, the request including a parameter comprising a user identifier of the first user;
   determine, by the multi-user aware platform application program interface and based on the parameter, that data associated with the first user and not data associated with the second user is to be returned;
   return, via the multi-user aware platform application program interface, the data associated with the first user;
   receive another request from the multi-user aware application to invoke the multi-user aware platform application program interface, the other request including another parameter comprising another user identifier of the second user;
   determine, by the multi-user aware platform application program interface and based on the other parameter, that the data associated with the second user and not the data associated with the first user is to be returned;
   return, via the multi-user aware platform application program interface, the data associated with the second user, wherein the multi-user aware application is configured to process the data associated with the first user and the data associated with the second user simultaneously and to process simultaneous input from the first user and the second user; and
   execute an instance of a single user aware application in a context of at least one of the first user or the second user, wherein the single user aware application is configured to retrieve at least one of the data associated with the first user or the data associated with the second user based on executing in the context of the at least one of the first user or the second user.

5. The computing device of claim 4, wherein the at least one computer storage medium has further computer executable instructions stored thereon which cause the computing device to:
   de-authenticate the first user; and
   notify the multi-user aware application that the first user has been de-authenticated, causing the multi-user aware application to be executed in only a context of the second user.

6. The computing device of claim 5, wherein the at least one computer storage medium has further computer executable instructions stored thereon which cause the computing device to remove the data associated with the first user from the computing device responsive to the first user being de-authenticated.

7. The computing device of claim 4, wherein the multi-user aware application is configured to present a graphical user interface comprising the data associated with the first user and the data associated with the second user.

8. The computing device of claim 4, wherein the single user aware application is configured to utilize one or more application programming interfaces that are different than the multi-user aware platform application program interface.

9. The computing device of claim 4, wherein the notification to the multi-user aware application that the first user has authenticated with the computing device includes the user identifier of the first user.

10. The computing device of claim 4, wherein the at least one computer storage medium has further computer executable instructions stored thereon which cause the computing device to execute the multi-user aware application using a default account that is not associated with any user.

11. The computing device of claim 4, wherein the at least one computer storage medium has further computer executable instructions stored thereon which cause the computing device to cause the multi-user aware application to display content of the data associated with the first user.

12. The computing device of claim 4, wherein the data associated with the first user comprises a file associated with the first user.

13. At least one computer storage medium having computer executable instructions stored thereon which, when executed by one or more processors, cause a computing device to:
receive a notification that a first user has authenticated with the computing device;
execute a first single user application associated with the first user, wherein the first single user application includes a first user context associated with the first user;
receive a first request to retrieve data or settings associated with the first user, wherein the first request does not include identification information for the first user;
in response to receiving the first request, invoke a single user application program interface that infers an identity of the first user from the first user context included in the first single user application;
retrieve, via the single user application program interface, the data or the settings associated with the first user;
receive a notification that a second user has authenticated with the computing device;
execute a second single user application associated with the second user, wherein the second single user application includes a second user context associated with the second user, wherein the second single user application is executed simultaneously with the first single user application;
receive a second request to retrieve data or settings associated with the second user, wherein the second request does not include identification information for the second user;
in response to receiving the second request, invoke the single user application program interface that infers an identity of the second user from the second user context included in the second single user application;
retrieve, via the single user application program interface, the data or the settings associated with the second user; and
execute a multi-user aware application in the first user context and the second user context, wherein the multi-user aware application is configured to retrieve (i) the data or the settings associated with the first user and (ii) the data or the settings associated with the second user.

14. The at least one computer storage medium of claim 13, having further computer executable instructions stored thereon which cause the computing device to:
receive an indication that the first user has been de-authenticated;
responsive to receiving the indication, cause the first single user application to stop executing; and
remove at least some of the data or the settings associated with the first user from the computing device.

15. The at least one computer storage medium of claim 13, wherein the computing device is configured to present a graphical user interface comprising the data or the settings associated with the first user and the data or the settings associated with the second user.

* * * * *